United States Patent
Kawauchi et al.

(10) Patent No.: US 9,849,643 B2
(45) Date of Patent: Dec. 26, 2017

(54) TIRE SHAPING DRUM (71) Applicant: Sumitomo Rubber Industries, Ltd., Kobe-shi, Hyogo (JP)

(72) Inventors: Yasunori Kawauchi, Kobe (KR); Syunichi Fujimura, Kobe (JP); Masami Nonaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 321 days.

(21) Appl. No.: 14/409,016

(22) PCT Filed: May 2, 2013

(86) PCT No.: PCT/JP2013/062760
§ 371 (c)(1),
(2) Date: Dec. 18, 2014

(87) PCT Pub. No.: WO2014/006970
PCT Pub. Date: Jan. 9, 2014

(65) Prior Publication Data
US 2015/0190976 A1    Jul. 9, 2015

(30) Foreign Application Priority Data

Jul. 2, 2012 (JP) .................................. 2012-148782

(51) Int. Cl.
*B29D 30/24* (2006.01)
*B29D 30/26* (2006.01)

(52) U.S. Cl.
CPC ............. *B29D 30/26* (2013.01); *B29D 30/24* (2013.01); *B29D 30/242* (2013.01); *B29D 2030/2657* (2013.01)

(58) Field of Classification Search
CPC ...... B29D 2030/265; B29D 2030/2657; B29D 30/24; B29D 30/26; B29D 30/242; B29D 30/30
(Continued)

(56) References Cited

U.S. PATENT DOCUMENTS

| 1,792,462 | A | * | 2/1931 | Hudson | ............... | B29D 30/248 |
| | | | | | | 156/419 |
| 2,042,498 | A | * | 6/1936 | Bostwick | ............. | B29D 30/248 |
| | | | | | | 156/419 |

(Continued)

FOREIGN PATENT DOCUMENTS

| EP | 0542541 A1 * | 5/1993 | ........... B29D 30/242 |
| EP | 0602783 A1 | 6/1994 | |

(Continued)

OTHER PUBLICATIONS

Machine Translation of JP 2010-284846.*
(Continued)

*Primary Examiner* — Martin Rogers
*Assistant Examiner* — Sedef Ayalp
(74) *Attorney, Agent, or Firm* — Birch, Stewart, Kolasch & Birch, LLP (57) ABSTRACT

A tire shaping drum has a central axle, a drum part which is capable of expansion and contraction, and a expanding/contracting means for changing the drum part. In the drum part, first segments having first end faces at both ends in the circumferential direction, and second segments having second end faces at both ends in the circumferential direction, are alternately seriated. There is provided with a backlash prevention means for preventing backlash between the contacting first end faces and second end faces when the drum part is in a diameter expanded state. Consequently, the first end faces and the second end faces closely contact with each (Continued)

other, and changes in the circularity of the drum part and the outer diameter of the drum part can be prevented.

6 Claims, 7 Drawing Sheets

(58) Field of Classification Search
USPC .......................................... 156/414, 417–419
See application file for complete search history.

(56) References Cited

U.S. PATENT DOCUMENTS

| | | | | |
|---|---|---|---|---|
| 2,979,110 | A * | 4/1961 | Henley | B29D 30/24 |
| | | | | 156/415 |
| 3,237,199 | A | 2/1966 | Brey | |
| 4,126,507 | A * | 11/1978 | Kim | B29D 30/24 |
| | | | | 156/415 |
| 4,425,180 | A * | 1/1984 | Samokhvalov | B29D 30/248 |
| | | | | 156/415 |
| 4,636,277 | A * | 1/1987 | Owen | B29D 30/24 |
| | | | | 156/417 |
| 5,618,374 | A * | 4/1997 | Byerley | B29D 30/242 |
| | | | | 156/418 |
| 6,390,166 | B1 * | 5/2002 | Roberts | B29D 30/24 |
| | | | | 156/417 |
| 2003/0024383 | A1 * | 2/2003 | Roberts | F15B 11/0365 |
| | | | | 92/120 |
| 2007/0164481 | A1 * | 7/2007 | Polk | B29C 31/047 |
| | | | | 264/320 |
| 2012/0318460 | A1 * | 12/2012 | Popp | B29D 30/242 |
| | | | | 156/415 |

FOREIGN PATENT DOCUMENTS

| | | | |
|---|---|---|---|
| EP | 1286827 | B1 | 3/2006 |
| JP | 2002-337251 | A | 11/2002 |
| JP | 2002337251 | A * | 11/2002 |
| JP | 2009-160845 | A | 7/2009 |
| JP | 2009-274392 | A | 11/2009 |
| JP | 2009274392 | A * | 11/2009 |
| JP | 2010-52181 | A | 3/2010 |
| JP | 2010052181 | A * | 3/2010 |
| JP | 2010-284846 | A | 12/2010 |
| JP | 2010284846 | A * | 12/2010 |

OTHER PUBLICATIONS

Extended European Search Report, dated Mar. 14, 2016, for European Application No. 13813017.4.
International Search Report issued in PCT/JP2013/062760, dated Jun. 11, 2013.

* cited by examiner

(diameter expanded state)

((diameter contracted state))

--PRIOR ART--

TIRE SHAPING DRUM

TECHNICAL FIELD

The present invention relates to a tire shaping drum, around which a sheeted material is wound, and which forms and shapes an annular tire member.

BACKGROUND ART

A tire shaping drum by which an annular tire member is formed and shaped has been proposed in the following patent document 1 for example.

Figure 7:
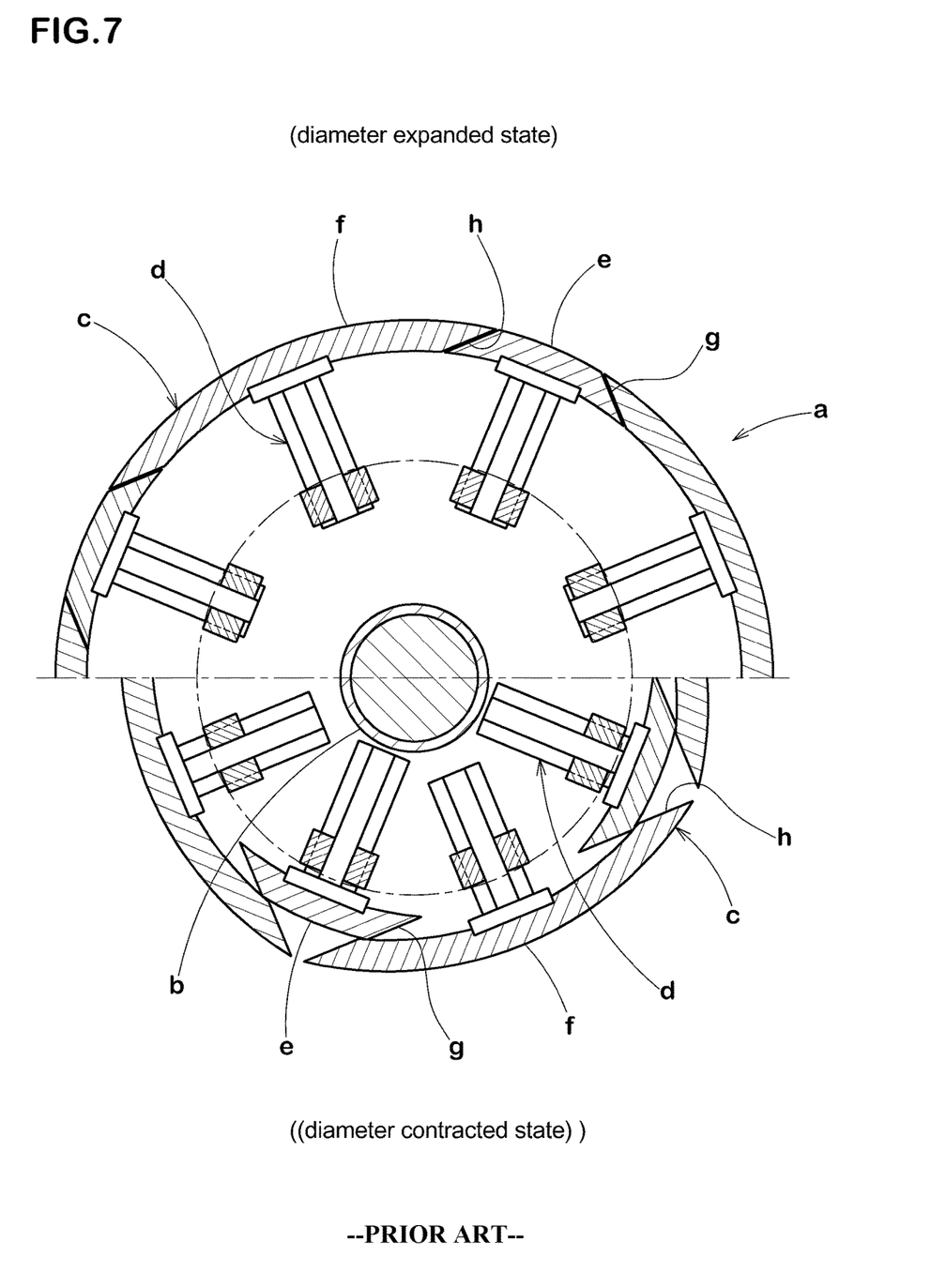
FIG. 7 a diagram for explaining the conventional tire shaping drum.

As shown in FIG. 7, this kind of tire shaping drum (a) has a central axle b which is rotatably supported, a drum part c which is disposed radially outward of the central axle b and which is capable of expansion and contraction, and an expanding/contracting means d which links the central axle b and the drum part c and which expands or contracts the drum part c.

In the drum part c, first segments e and second segments f are alternately seriated in the circumferential direction thereof, and the drum part is annular.

The first segment e has, at both ends in the circumferential direction thereof, first end faces g inclined so that the length in the circumferential direction of the segment increases towards the radially inside.

The second segment f has, at both ends in the circumferential direction thereof, second end faces h inclined so that the length in the circumferential direction of the segment decreases towards the radially inside.

The first end faces g come into contact with the second end faces h when the drum part c is expanded in the diameter.

PRIOR ART DOCUMENT

Patent Document

Patent document 1: Japanese Patent Application Publication No. 2009-160845

SUMMARY OF THE INVENTION

Problems to be Solved by the Invention

In this kind of tire shaping drum (a), the drum part c repeats expansion and contraction every time the tire member is formed and shaped. Therefore, due to resultant wear, deformation and the like, there is a possibility that backlash is caused between the first end faces g of the first segments e and the second end faces h of the second segments f.

As a result, the circularity of the drum part c is decreased, and the outer diameter of the drum part is varied during winding the tire member. Thus, there is a problem such that the quality of the tire member wound therearound is deteriorated.

The present invention was made in view of the above problem, and a primary object is to provide a tire shaping drum in which the quality of the tire member can be improved by preventing backlash between two adjacent segments, and tire manufacturing productivity can be improved by decreasing a cause of, facility stopping.

Means of Solving the Problems

The present invention is a tire shaping drum
which has a central axle which is rotatably supported,
a drum part which is disposed radially outward of the central axle and which is capable of expansion and contraction, and
an expanding/contracting means which links the central axle and the drum part and which changes the drum part into a diameter contracted state and a cylindrical diameter expanded state, wherein
the drum part becomes annular by seriating first segments and second segments alternately in the circumferential direction,
the first segment has, at both ends in the circumferential direction thereof, first end faces inclined so that the length in the circumferential direction of the segment increases towards the radially inside,
the second segments has, at both ends in the circumferential direction thereof, second end faces inclined so that the length in the circumferential direction of the segment decreases towards the radially inside, and
the first end faces come into contact with the second end faces when the drum part is in a diameter expanded state, and
the tire shaping drum is characterized by being provided with a backlash prevention means for preventing backlash between the first end faces and the second end faces when in the diameter expanded state.

In a preferable embodiment, the backlash prevention means is provided on the first segments and comprises contact parts which radially outwardly push inner surfaces extending between the second end faces on the radially inside of the second segments when the drum part is in the diameter expanded state.

In a preferable embodiment, the contact parts extend in the circumferential direction from radially inner edges of the first end faces of the first segments.

In a preferable embodiment, the contact parts are provided at both sides in the circumferential direction of the first segments.

In a preferable embodiment, the contact part comprises a circular-arc-shaped main portion fixed to the inner surface between the first end faces on the radially inside of the first segments, and a shock-absorbing cushion material fixed to the radially outer surface of the main portion.

In a preferable embodiment, the contact part has a thickness of 8 to 25 mm in the radial direction, a length of 40 to 120 mm in the circumferential direction, and a length of 20 to 100 mm in the axial direction of the drum.

In a preferable embodiment, the backlash prevention means comprises spring means for closely contacting the first end faces of the first segments and the second end faces of the second segments each other when in the diameter expanded state.

In a preferable embodiment, the expanding/contracting means has a plurality of radially moving slide parts,
each first segment and each second segment are supported by each slide part, and the spring means circumferentially links the adjacent slide parts.

Effects of the Invention

According to the present invention, there is provided with a backlash prevention means for preventing backlash between the first end faces of the first segments and the second end faces of the second segments when the drum part is in the diameter expanded state.

Therefore, the first end faces and the second end faces closely contact with each other, and the backlash can be prevented. Accordingly, the decrease in the circularity of the drum part, variation of the outer diameter of the drum part and the like can be prevented.

As a result, the quality of the tire member can be improved, and as a cause of facility stopping is decreased, tire manufacturing productivity can be improved.

BRIEF EXPLANATION OF THE DRAWINGS

FIG. 2 (a) is an A-A cross sectional view taken along the central axle of the tire shaping drum of FIG. 1. (b) is a B-B cross sectional view of FIG. 2(a).

FIG. 5 (a) to (c) are diagrams for explaining the expansion and contraction of the tire shaping drum of FIG. 1.

FIGS. 6 (a) and (b) are diagrams for explaining the motion of spring means of a tire shaping drum showing another embodiment of the present invention.

MODE FOR CARRYING OUT THE INVENTION

An embodiment of the present invention is described below based on the drawings.

Figure 1:
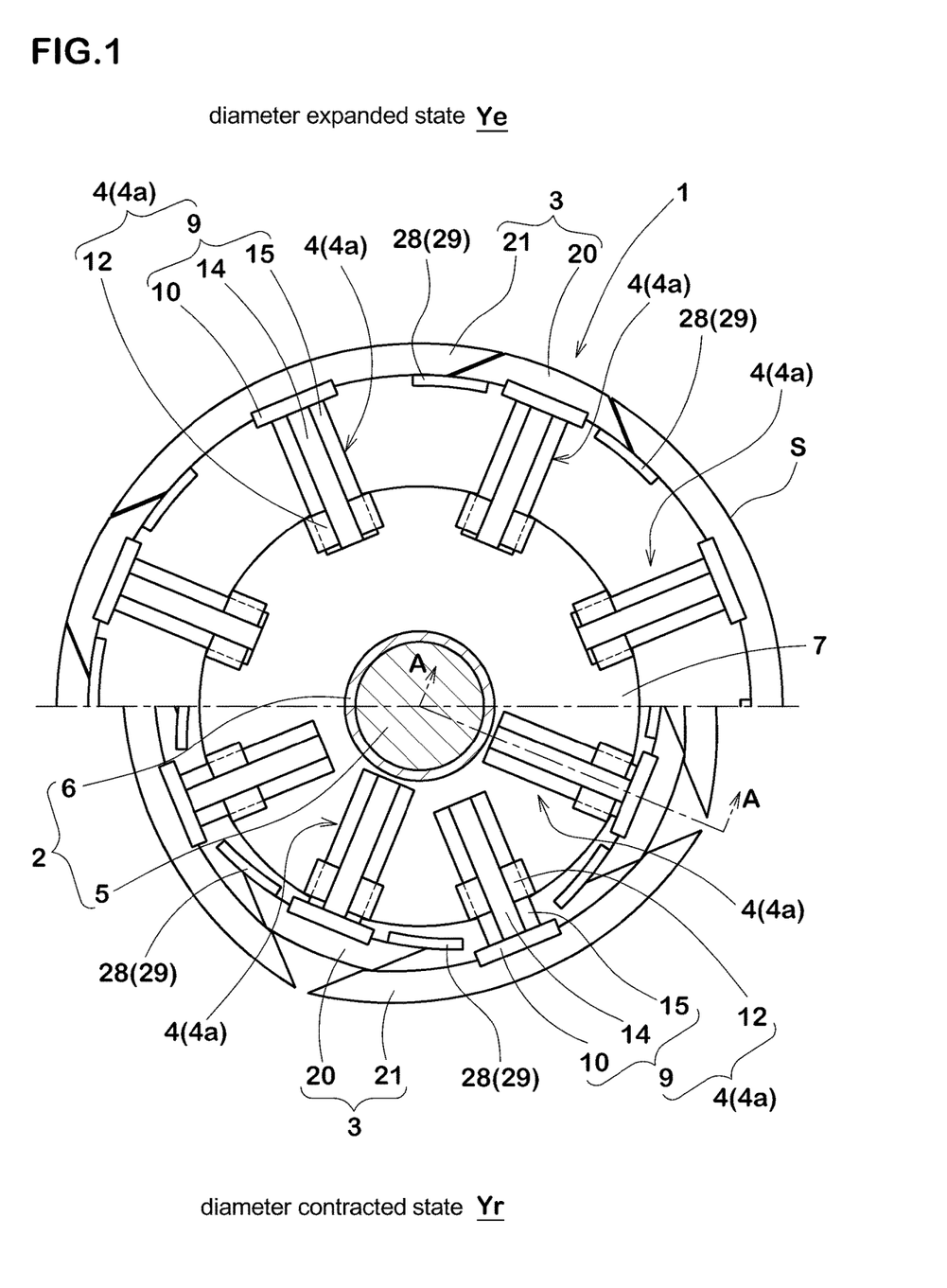
FIG. 1 A cross sectional view of a tire shaping drum at right angle to the central axle, for showing an embodiment of the present invention.

As shown in FIG. 1, in this embodiment, the tire shaping drum 1 has a rotatably supported central axle 2, a drum part 3 which is disposed radially outward of the central axle 2 and which is capable of expansion and contraction, and an expanding/contracting means 4 which links the central axle 2 and the drum part 3.

The expanding/contracting means 4 can change the drum part 3 from a diameter contracted state Yr to a cylindrical diameter expanded state Ye, or from the diameter expanded state Ye to the diameter contracted state Yr.

The tire shaping drum 1 in the diameter expanded state Ye provides a cylindrical outer surface s for the drum part 3. On the outer surface s, for example, a sheet-like rubber material is wound along the circumferential direction.

Both ends of the wound rubber material are spliced, and a cylindrical tire member is formed and shaped.

After the forming and shaping of the tire member, the drum part 3 is made in the diameter contracted state Yr by the expanding/contracting means 4.

The tire member is removed from one side of the central axle 2 in the axial direction.

The central axle 2, for example, comprises a rotatably-supported central axle main portion 5, and cylindrical mounting members 6 fitted onto both end portions of the central axle main portion 5.

For example, like a cantilever, one end of the central axle main portion 5 is supported by a main frame (not shown) of the shaping drum 1 through a bearing or the like, As shown in FIG. 2(a), on the axially inside of the mounting member 6, there is provided with a radially outwardly extending substantially disk-shaped side plate 7.

As shown in FIG. 1, the expanding/contracting means 4 comprises a plurality of expansion-and-contraction parts 4a arranged in the circumferential direction of the side plate 7. As shown in FIG. 2(a), the expansion-and-contraction part 4a has a cylinder device 11 fixed to the side plate 7, a slide part 9 moved by the cylinder device 11, and a guide part 12 for guiding the slide part 9 in the radial direction.

In this embodiment, the expanding/contracting means 4 is disposed in each end side of the central axle 2 in the axial direction.

For example, eight expansion-and-contraction parts 4a are arranged at regular intervals in the circumferential direction of the side plate 7.

The cylinder device 11 is, for example, supported by the side plate 7 through a mounting bracket 16 attached to the axially inner surface 7b of the side plate 7.

The cylinder device 11 has a cylinder main portion 17, a rod 18 moving in and out of the cylinder main portion 17, and a pair of channels 17a and 17b connected to the cylinder main portion 17. The rod 18 reciprocates radially of the central axle 2 by operating fluid, e.g. air, oil or the like loaded in the cylinder main portion 17 through the channel 17a, 17b.

Figure 2:
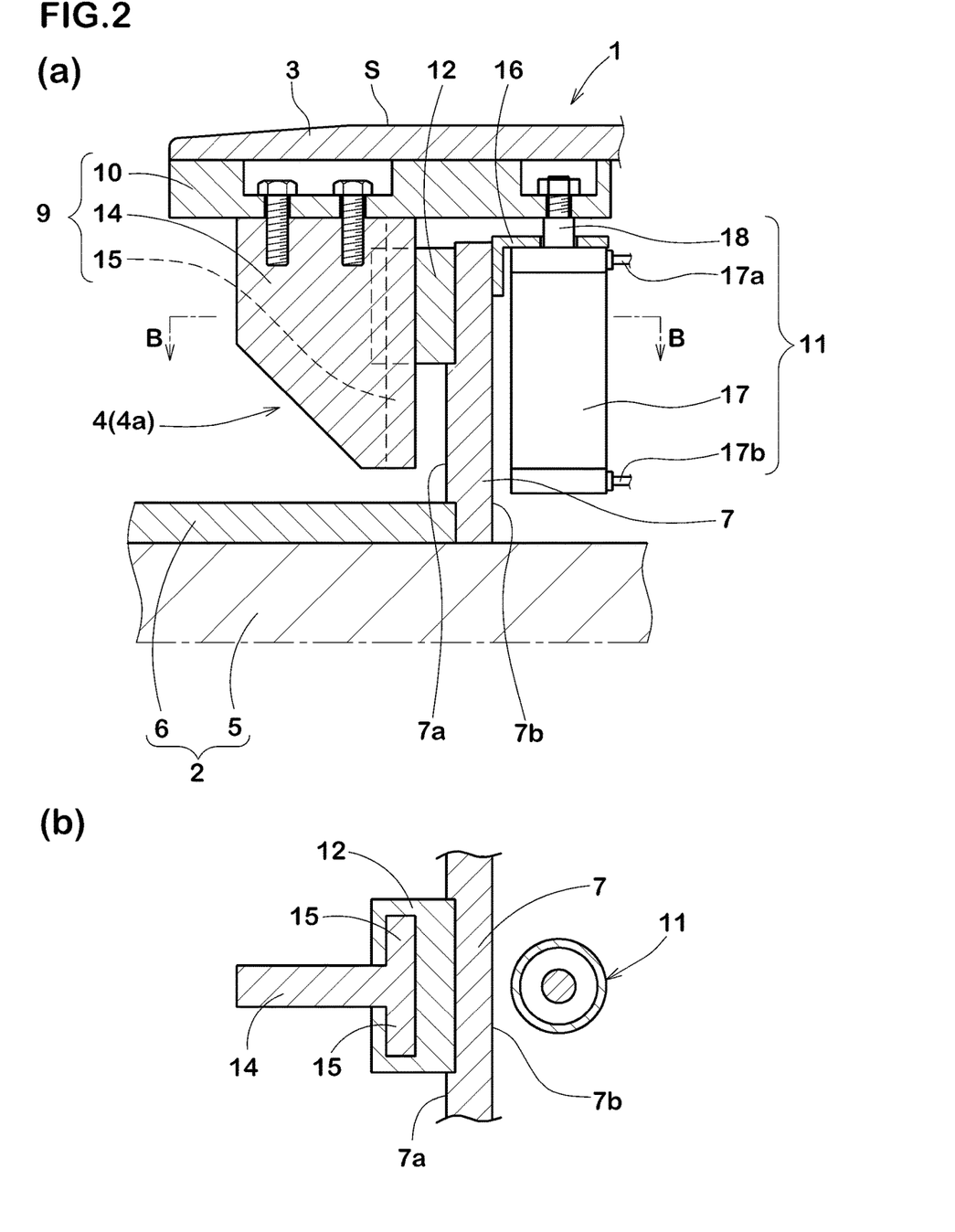

As shown in FIG. 2 (a) or (b), the slide part 9 has a slide part main portion 14 disposed on the axial outer surface 7a side of the side plate 7, and
a plate-like metal part 10 for mounting fixed to the radially outer end of the slide part main portion 14.

The slide part main portion 14 is a plate whose section is substantially T-shaped, and it is provided with a pair of flange parts 15 which are guided along the guide part 12 fixed to the outer surface 7a of the side plate 7.

On the radially outside of the side plate 7, the metal part 10 for mounting extends to the axially inside of the side plate 7, and the tip of the rod 18 of the cylinder device 11 is fixed thereto.

When the rod 18 of the cylinder device 11 reciprocates, the slide part 9 is moved toward the radially inside or outside while the slide part main portion 14 is guided by the guide part 12.

Figure 3:
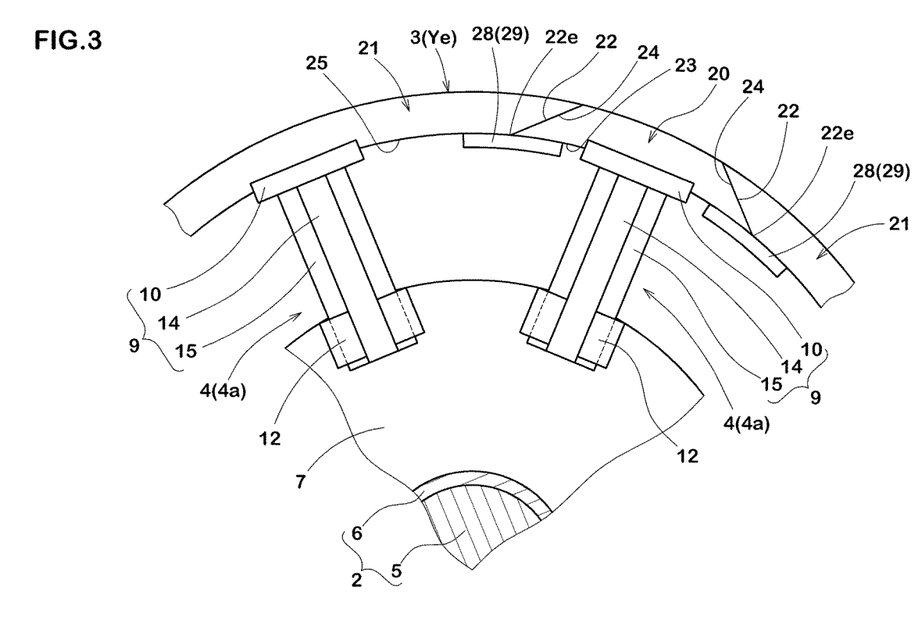
FIG. 3 a partial enlarged explanatory diagram of the tire shaping drum of FIG. 1.

As shown in FIG. 3, the drum part 3 is composed of first segments 20 and second segments 21 disposed alternately in the circumferential direction.

By the first segments 20 and the second segments 21 which are seriated, the drum part 3 is formed substantially in the form of a ring.

The first segment 20 has first end faces 22 at both ends in the circumferential direction, which are inclined so that the length in the circumferential direction of the segment increases towards the radially inside, and an inner surface 23 extending between the first end faces 22 and 22 on the radially inside. The metal part 10 for mounting of the slide part 9 is fixed to the central portion of the inner surface 23 of the first segments 20.

The second segment 21 has second end faces 24 at both ends in the circumferential direction, which are inclined so that the length in the circumferential direction of the segment decreases towards the radially inside, and an inner surface 25 extending between the second end faces 24 on the radially inside. The metal part 10 for mounting of the slide part 9 is fixed to the central portion of the inner surface 25 of the second segments 21.

The shaping drum 1 has a backlash prevention means 28 for preventing backlash between the first end faces 22 and the second end faces 24 when the drum part 3 is in the diameter expanded state Ye. Consequently, the first end faces 22 and the second end faces 24 closely contact with each other, and backlash between the first segments 20 and the second segments 21 is prevented. Therefore, it is possible to prevent the decrease in the circularity of the drum part 3, the variation of the outer diameter of the drum part 3 and the like.

The backlash prevention means 28 in this embodiment comprises a contact part 29 provided on each side of the first segment 20 in the circumferential direction.

The contact part 29 extends in the circumferential direction from the radially inner edge 22e of the first end face 22 of the first segment 20.

Consequently, the contact part 29 radially outwardly pushes the inner surface 25 of the second segment 21 when the drum part 3 is in the diameter expanded state Ye.

Figure 4:
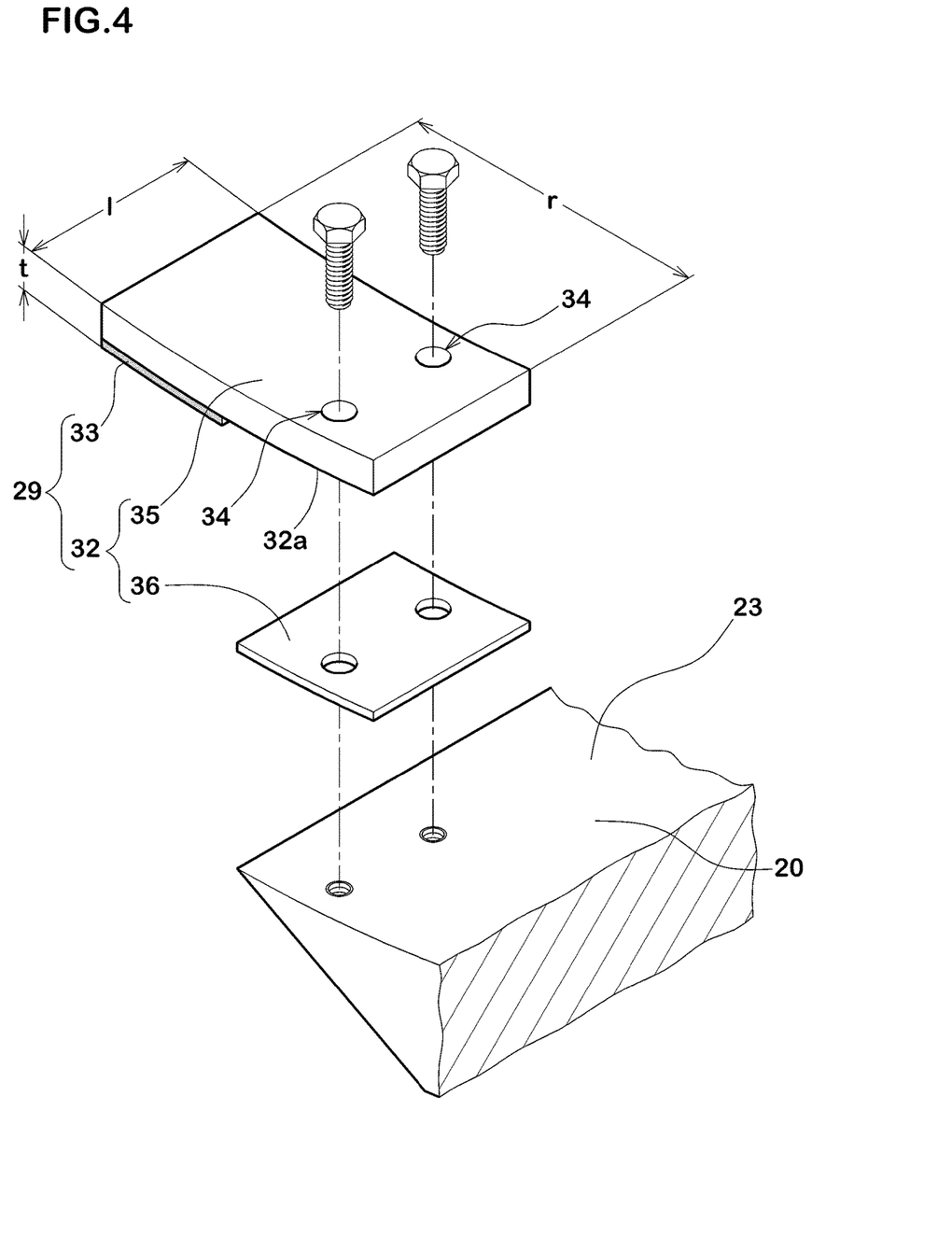
FIG. 4 an exploded perspective view of the contact part of the tire shaping drum of FIG. 1.

As shown in FIG. 4, the contact part 29 comprises a main portion 32 fixed to the inner surface 23 of the first segment 20, and a shock-absorbing cushion material 33 fixed to the radially outer surface 32a of the main portion 32. In this embodiment, the contact part 29 is provided on each side of the first segment 20 in the circumferential direction.

On each side of the first segment 20 in the circumferential direction, plural units are disposed at predetermined intervals in the axial direction of the central axle 2.

The main portion 32 is formed of a metal material, for example, iron and the like. The main portion 32 is composed of a circular-arc-shaped main portion block 35, and a shim body 36 formed of a thin plate or the like fixed between the main portion block 35 and the first segment 20. Consequently, the thickness t in the radial direction of the contact part 29 becomes equal to the summation of the thickness in the radial direction of the main portion block 35 and the thickness in the radial direction of the shim body 36.

The cushion material 33 is formed of, for example, a rubber material. More preferably, the cushion material 33 is formed of a rubber material containing reinforcing thread.

The cushion material 33 is fixed to the radially outer surface 32a of the main portion 32.

Since the cushion material 33 is fixed to the contact part 29, a shock at the time of contacting between the contact part 29 and the second segment 21 can be mitigated by deformation of the cushion material 33.

At the same time, due to the elasticity of the cushion material 33, the second segment 21 is pushed radially outward, and the backlash thereof is prevented.

For example, the thickness in the radial direction of the cushion material 33 is set to be the same as that of the shim body 36.

For example, the thickness t in the radial direction of the contact part 29 is set to be constant in the circumferential direction of the drum.

For example, it is preferred that the thickness t in the radial direction of the contact part 29 is set in a range of from 8 to 25 mm.

If the thickness t in the radial direction of the contact part 29 is less than 8 mm, deformation of the contact part 29 can be caused by contacting with the inner surface 25 of the second segment 21. If the thickness t in the radial direction of the contact part 29 is more than 25 mm, wear of the flange parts 15 and guide grooves 12 can be accelerated by the weight of the contact part 29. From these standpoints, the thickness t in the radial direction of the contact part 29 is more preferably in a range of 12 to 18 mm.

In order to disperse the load evenly on the segments 20 and 21 when the contact parts 29 come into contact with the second segments 21, it is preferable for the contact part 29 that, for example, about 3/7 of the circumferential length r is fixed to the first segment 20, and about 4/7 of the circumferential length r contacts with the second segment 21. In order to provide strength for the fixed portion between the contact part 29 and the first segment 20, the circumferential length r of the contact part 29 is preferably set to such a length that it is possible to form a bolt-hole 34 for inserting at least one bolt.

Based on this standpoint, the circumferential length r of the contact part 29 is preferably in a range of 40 to 120 mm, more preferably in a range of 50 to 90 mm.

The length in the axial direction 1 of the contact part 29 is preferably in a range of 20 to 100 mm.

If the length in the axial direction 1 of the contact part 29 is less than 20 mm, it is difficult to form the bolt-hole 34. If the length in the axial direction 1 of the contact part 29 is more than 100 mm, the weight of the contact part 29 is increased, and wear of the guide groove 12 and the flange parts 15 can be accelerated.

From these standpoints, the length in the axial direction 1 of the contact part 29 is more preferably in a range of 35 to 65 mm.

Next, function of the present invention will be described.

Figure 5:
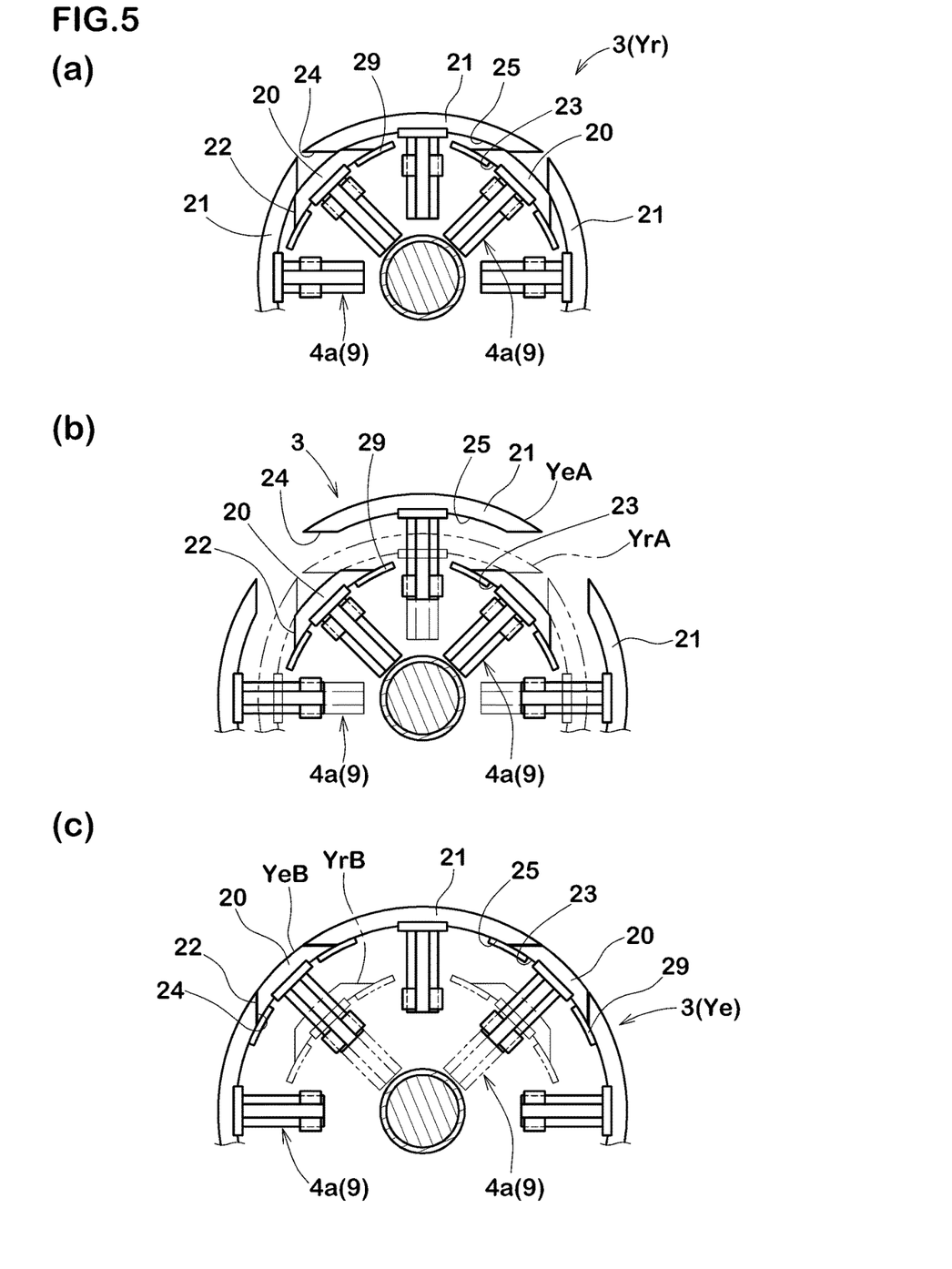

In the above-mentioned shaping drum 1, as shown in FIG. 5 (a), when the diameter of the drum part 3 is expanded, the rods 18 of the cylinder devices 11 (shown in FIG. 2 (a)) connected to the second segments 21 extend.

Thereby, as shown in FIG. 5 (b), the second segments 21 are moved radially outwardly from their contraction position YrA to their expansion position YeA.

After the second segments 21 have been moved to the expansion position YeA, the rods 18 of the cylinder devices 11 (shown in FIG. 2 (a)) connected to the first segments 20 are extended from the state shown in FIG. 5 (b).

Thereby, as shown in FIG. 5 (c), the first segments 20 are moved radially outwardly from their contraction position YrB to the expansion position YeB in the diameter expanded state Ye.

When the drum part 3 becomes the diameter expanded state Ye, the first end faces 22 of the first segments 20 come into contact with the second end faces 24 of the second segments 21. The contact parts 29, as the backlash prevention means, radially outwardly push the inner surfaces 25 of the second segments 21. Consequently, the second segments 21 are prevented from moving radially inward.

Accordingly, the inner surfaces 23 of the first segments 20 and the inner surfaces 25 of the second segments 21 are aligned continuously in the circumferential direction, and the first end faces and the second end faces closely contact with each other. And the backlash of the drum part 3 can be prevented (mutual displacement can be prevented).

On the occasion of the contraction of the drum part 3, contrary to the above-mentioned occasion of the expansion of the drum part 3,
starting from the diameter expanded state Ye shown in FIG. 5 (c), the first segments 20 are first moved radially inwardly from the expansion position YeB to the contraction position YrB. Then, from the state shown in FIG. 5 (b), the second segments 21 are moved radially inwardly from the expansion position YeA to the contraction position YrA.

Thereby, the drum part 3 is contracted to the diameter contracted state Yr shown in FIG. 5 (a).

Figure 6:
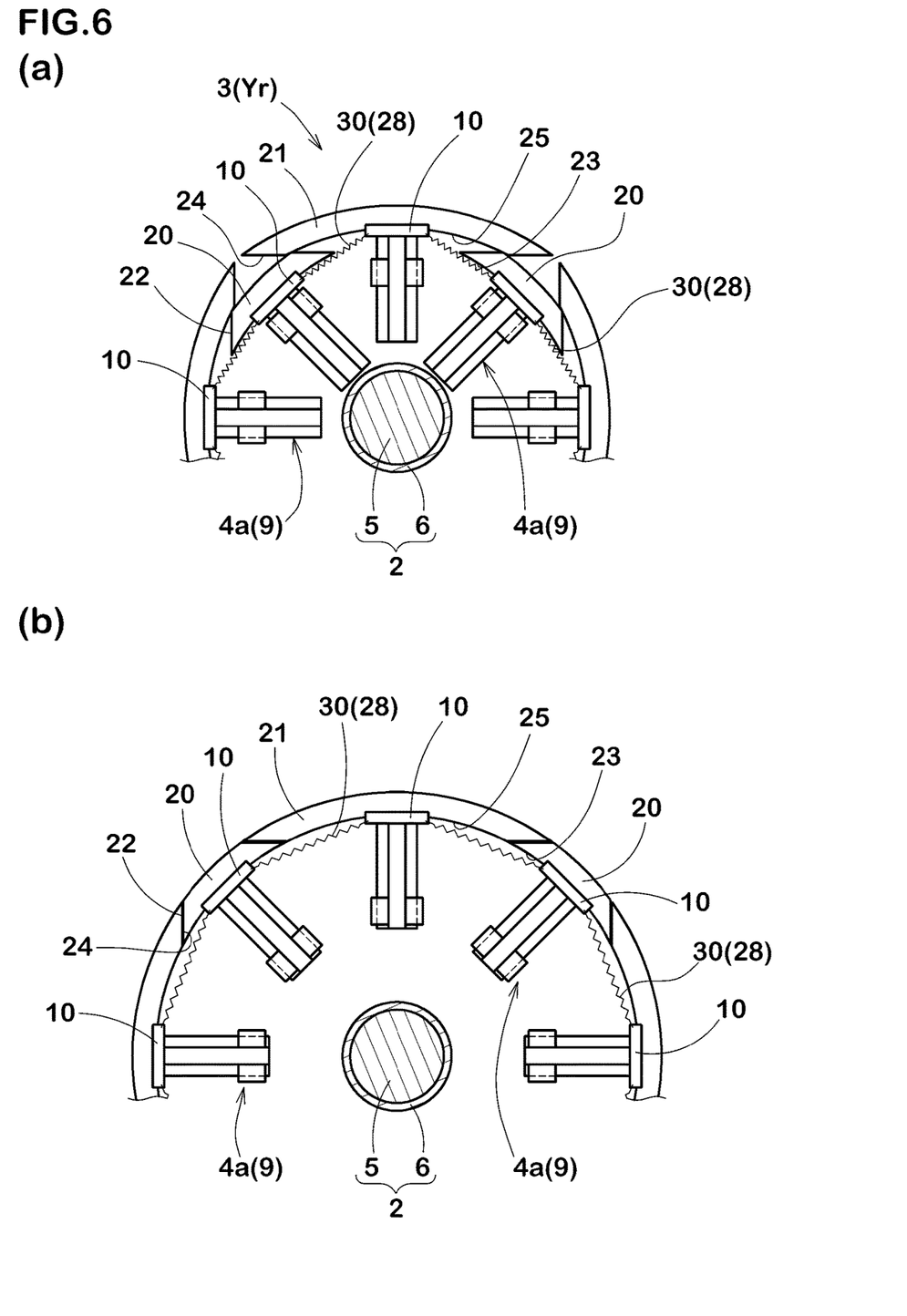

In FIG. 6, another embodiment of the backlash prevention means 28 in the present invention is shown.

In this embodiment, the same reference signs are used for the same structures as explained above, and the detailed description therefor is omitted.

As shown in FIG. 6 (a) or (b), the shaping drum 1' in this embodiment comprises, as the backlash prevention means 28, spring means 30 for closely contacting the first end faces 22 of the first segments 20 and the second end faces 24 of the second segments 21 with each other when in the diameter expanded state Ye of the drum part 3.

The spring means 30 link the adjacent slide parts 9 in the circumferential direction.

Thereby, in the diameter expanded state Ye of the drum part 3, the first end faces 22 of the first segments 20 and the second end faces 24 of the second segments 21 are biased toward such directions that they can contact with each other.

For example, the spring means 30 are coiled springs stretched between the circumferentially adjacent metal parts 10, 10 for mounting.

As shown in FIG. 6 (a), when the drum part 3 is in the diameter contracted state Yr, the spring means 30 becomes substantially zero stretched and in a no-load state.

On the other hand, as shown in FIG. 6 (b), when the drum part 3 is in the diameter expanded state Ye, the spring means 30 are stretched between the slide parts 9.

When the drum part 3 is in the diameter expanded state Ye, the stretched spring means 30 bias the slide parts 9 at both ends toward such directions that they attract each other.

Therefore, the first end face 22 of the first segment 20 supported by each of the slide parts 9 closely contacts with the second end face 24 of the second segment 21.

Alternatively to the coiled spring, the spring means 30 may be of a structure having an elastic body, rubber or the like, having a reduction percentage similar to that of the coiled spring.

While description has been made of embodiments of the present invention, the present invention should not be limited to these embodiments; it is possible to carry out the invention by changing into various embodiments.

For example, the backlash prevention means 28 may be of such a structure that includes the contact parts 29 and the spring means 30.

EMBODIMENTS

By tire shaping drums having specifications listed in Table 1, a carcass ply for 155/65R14 size was experimentally manufactured as a cylindrical tire member.

Then, the state of the splice portion of the cylindrical carcass, the state of imbalance of material occurring in a tire using the carcass, the durability of the tire shaping drum, and a comprehensive general evaluation were evaluated.

The evaluation methods were as follows.

<State of Splice Portion of Carcass>

The state of the splice portion of the carcass was evaluated by comparison with a carcass (comparative example) experimentally manufactured by a conventional shaping drum shown in FIG. 7. The larger value shows that a better carcass in accordance with the shape of the drum part could be formed and shaped.

<State of Imbalance of Material in Tire>

The state of imbalance of material occurring in the tire was evaluated by comparison with a tire using the carcass (comparative example) experimentally manufactured by the conventional shaping drum shown in FIG. 7. The larger value shows that tire defects were lessened.

<Durability of Shaping Drum>

The state of wear of the shaping drum was observed after the carcass was experimentally manufactured plural times, and the durability of the shaping drum was evaluated by comparison with the shaping drum shown in FIG. 7. The larger value shows that the wear was less.

<General Evaluation>

The above-mentioned state of splice portion, the state of imbalance and the durability of the shaping drum were comprehensively evaluated, and the general evaluation was evaluated by comparison with the shaping drum shown in FIG. 7. The larger value is better.

TABLE 1

|  |  | comparative example | embodiment 1 | embodiment 2 | embodiment 3 | embodiment 4 | embodiment 5 |
|---|---|---|---|---|---|---|---|
| specifications | backlash prevention means | none | springs | contact parts | both | both | both |
|  | contact part thickness t (mm) | — | — | 15 | 8 | 15 | 25 |
|  | contact part axial length l (mm) | — | — | 50 | 50 | 50 | 50 |
|  | contact part circum. length r (mm) | — | — | 70 | 70 | 70 | 70 |
|  | existence or nonexistence of cushion material | non-existence | non-existence | existence | existence | existence | existence |
| evaluation | splice state | 95 | 100 | 105 | 120 | 160 | 160 |
|  | imbalance state | 95 | 100 | 105 | 115 | 130 | 130 |
|  | durability of shaping drum | 102 | 100 | 98 | 98 | 95 | 93 |
|  | general evaluation | 100 | 110 | 115 | 118 | 130 | 125 |

|  |  | embodiment 6 | embodiment 7 | embodiment 8 | embodiment 9 | embodiment 10 |
|---|---|---|---|---|---|---|
| specifications | backlash prevention means | both | both | both | both | both |
|  | contact part thickness t (mm) | 15 | 15 | 15 | 15 | 15 |
|  | contact part axial length l (mm) | 20 | 100 | 50 | 50 | 50 |
|  | contact part circum. length r (mm) | 70 | 70 | 40 | 120 | 70 |
|  | existence or nonexistence of cushion material | existence | existence | existence | existence | non-existence |

TABLE 1-continued

| evaluation | splice state | 130 | 160 | 140 | 160 | 110 |
|---|---|---|---|---|---|---|
| | imbalance state | 118 | 130 | 120 | 130 | 102 |
| | durability of shaping drum | 98 | 91 | 98 | 93 | 80 |
| | general evaluation | 120 | 123 | 122 | 125 | 105 |

As shown in Table 1, the carcasses formed and shaped by the use of the tire shaping drums of the present invention were reduced in flabbiness, and it could be confirmed that the tires using them were reduced in defectiveness and had high quality.

EXPLANATION OF THE REFERENCE SIGNS 1 tire shaping drum
2 central axle
3 drum part
4 expanding/contracting means
9 slide part
20 first segment
21 second segment
22 first end face
23 inner surface
24 second end face
25 inner surface
28 backlash prevention means
29 contact part
30 spring means
Yr diameter contracted state
Ye diameter expanded state
t thickness in the radial direction
r length in the radial direction
l length in the axial direction

The invention claimed is:

1. A tire shaping drum comprising
a central axle which is rotatably supported,
a drum part which is disposed radially outward of the central axle and which is capable of expansion and contraction, and
an expanding/contracting device which links the central axle and the drum part and which changes the drum part into a diameter contracted state or a diameter expanded state, wherein
the drum part comprises first segments and second segments disposed alternately in the circumferential direction,
each said first segment is provided at its both ends in the circumferential direction of the drum with respective first end faces inclined so that the length in the circumferential direction of the segment measured between the first end faces increases towards the radially inside, and
each said second segment is provided at its both ends in the circumferential direction of the drum with respective second end faces inclined so that the length in the circumferential direction of the segment measured between the second end faces decreases towards the radially inside, wherein
the expanding/contracting device is constructed so that in the diameter contracted state, the first segments are positioned radially inside the second segments,
in the course from the diameter contracted state to the diameter expanded state, the first segments and the second segments are moved radially outwardly, and
in the diameter expanded state, the first segments and the second segments are seriated annularly and alternately in the circumferential direction so that the first end faces contact with the second end faces,
wherein
the tire shaping drum is provided with a backlash prevention device comprising contact parts,
each said contact part fixed to one of the first segments so that the contact part is moved radially together with the first segment,
each said contact part comprises a protruding portion, which protrudes in the circumferential direction from a radially inner edge of one of the first end faces of said one of the first segments, and which is provided on its radially outer surface with a cushion fixed thereto, whereby
in the diameter contracted state where the first segments are positioned radially inside the second segments, the contact parts are apart from the second segments, whereas in the diameter expanded state, the contact parts are moved radially outwardly together with the first segments and radially outwardly push respective radially inner surfaces of the second segments through the cushions for preventing backlash between the first end faces and the second end faces when in the diameter expanded state,
wherein
each said contact part is composed of a main portion fixed to the first segment with bolts so as to have said protruding portion to which said cushion is fixed, and a shim body formed of a thin plate disposed between the main portion and the first segment and secured therebetween with said bolts together with said main portion.

2. The tire shaping drum as set forth in claim 1, wherein the contact parts are provided on both sides of each of the first segments in the circumferential direction.

3. The tire shaping drum as set forth in claim 2, wherein the backlash prevention device comprises spring devices for closely contacting the first end faces of the first segments and the second end faces of the second segments with each other when in the diameter expanded state.

4. The tire shaping drum as set forth in claim 3, wherein the expanding/contracting device has a plurality of slide parts movable in the radial direction, and the first segments and the second segments are supported by the respective slide parts, and the spring devices link the circumferentially adjacent slide parts.

5. The tire shaping drum as set forth in claim 4, wherein said main portion of each said contact part has a thickness in the radial direction of 8 to 25 mm, a length in the circumferential direction of 40 to 120 mm, and a length in the axial direction of the drum of 20 to 100 mm.

6. The tire shaping drum as set forth in claim 1, wherein the backlash prevention device comprises spring devices for closely contacting the first end faces of the first segments and the second end faces of the second segments with each other when in the diameter expanded state.

* * * * *